(12) United States Patent
Tsirkin (10) Patent No.: US 10,248,785 B2
(45) Date of Patent: Apr. 2, 2019

(54) APPLICATION MEMORY PROTECTION USING A HOST PAGE TABLE SWITCHING VIRTUAL MACHINE FUNCTION

(71) Applicant: Red Hat Israel, Ltd., Ra'anana (IL)

(72) Inventor: Michael Tsirkin, Yokneam Illit (IL)

(73) Assignee: Red Hat Israel, Ltd., Ra'anana (IL)

( * ) Notice: Subject to any disclaimer, the term of this patent is extended or adjusted under 35 U.S.C. 154(b) by 243 days.

(21) Appl. No.: 15/055,904

(22) Filed: Feb. 29, 2016

(65) Prior Publication Data

US 2017/0249458 A1 Aug. 31, 2017

(51) Int. Cl.
G06F 9/455 (2018.01)
G06F 21/52 (2013.01)

(52) U.S. Cl.
CPC .......... *G06F 21/52* (2013.01); *G06F 9/45558* (2013.01); *G06F 2009/45583* (2013.01); *G06F 2009/45587* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 9,117,081 B2 | 8/2015 | Lukacs et al. | |
| 9,400,885 B2 * | 7/2016 | Tosa | G06F 21/554 |
| 2008/0155168 A1 * | 6/2008 | Sheu | G06F 12/1027 |
| | | | 711/6 |
| 2013/0276057 A1 | 10/2013 | Smith et al. | |
| 2014/0173600 A1 | 6/2014 | Ramakrishnan | |
| 2014/0283056 A1 | 9/2014 | Bachwani et al. | |
| 2014/0380009 A1 | 12/2014 | Lemay et al. | |
| 2015/0199514 A1 | 7/2015 | Tosa et al. | |
| 2015/0288659 A1 | 10/2015 | Lukacs et al. | |

OTHER PUBLICATIONS

How to Implement a Software-Based SMEP(Supervisor Mode Execution Protection) with Virtualization/Hypervisor Technology published Nov. 12, 2014 (4 pages).
Zero-Footprint Guest Memory Introspection from Xen published Aug. 18, 2014; Mihai Dontu, Ravi Sahita (39 pages).
Extending KVM Models Toward High-Performance NFV published Oct. 14, 2014; Jun Nakajima, James Tsai, Mesut Ergin, Yang Zhang, Wei Wang (28 pages).

* cited by examiner

*Primary Examiner* — Joseph P Hirl
*Assistant Examiner* — Hassan Saadoun
(74) *Attorney, Agent, or Firm* — K&L Gates LLP (57) ABSTRACT

A hypervisor generates first and second page views, where a guest physical address points to a first page of the first page view and a second page of the second page view. A first pointer value is written to the first page and a second pointer value is written to the second page. A guest operating system executes a first task and if a determination to switch to the second task is made, the guest operating system reads a current pointer value and determines what the current page view is. If the guest operating system determines that the current page view is the first page view, the guest operating system saves the first pointer value in a first memory of the first task, loads the second pointer value from a second memory of the second task, and executes a virtual machine function to switch to the second page view.

19 Claims, 6 Drawing Sheets

APPLICATION MEMORY PROTECTION USING A HOST PAGE TABLE SWITCHING VIRTUAL MACHINE FUNCTION

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

One vulnerability in virtualized systems is due to malware attacks that attempt to discover and exploit application memory. For example, this may occur when application pointers are exposed in the course of execution. The present disclosure seeks to increase the robustness of virtualized systems to such malware attacks.

SUMMARY

The present disclosure provides a new and innovative system, methods and apparatus for application memory protection using a host page table switching virtual machine function.

A system includes a memory, one or more processors, in communication with the memory, a virtual machine, including a guest operating system, executing on the one or more processors, and a hypervisor executing on the one or more processors. The hypervisor generates a first page view and a second page view, where a guest physical address of the virtual machine points to a first page of the first page view and a second page of the second page view. The first page of the first page view is initialized with a first pointer value and the second page of the second page view is initialized with a second pointer value. The guest operating system executes a first task and then determines whether to switch to a second task. If the guest operating system makes a determination to switch from the first task to the second task, the guest operating system reads a current pointer value pointed to by the guest physical address, where the current pointer value is either the first pointer value or the second pointer value. The guest operating system then determines what the current page view is based on the current pointer value, where the current page view is either the first page view or the second page view. If the guest operating system determines that the current page view is the first page view, the guest operating system saves the first pointer value in a first memory of the first task, loads the second pointer value from a second memory of the second task, and executes a virtual machine function, where the virtual machine function receives the second pointer value as a parameter and, when executed, switches to the second page view.

A system includes a memory, one or more processors, in communication with the memory, a virtual machine, including a guest operating system, executing on the one or more processors, and a hypervisor executing on the one or more processors. The hypervisor generates a first host page table and a second host page table. Responsive to generating the first host page table, the hypervisor generates a first host page table pointer and a second host page table pointer, where the first and the second host page table pointers are initialized to point to the first host page table. A first request to protect a first page view corresponding to the first host page table is received from a first application running on the virtual machine. Responsive to receiving the first request, the hypervisor determines whether to grant the first request. If the hypervisor makes a determination to grant the first request, the hypervisor modifies at least one access status parameter of the first page view corresponding to the first host page table. Responsive to modifying the at least one access status parameter, the hypervisor modifies the second host page table pointer to point to the second host page table, where a second page view corresponds to the second host page table. Then the hypervisor provides to the guest operating system a first pointer value corresponding to the first host page table pointer and a second pointer value corresponding to the second host page table pointer.

Additional features and advantages of the disclosed method and apparatus are described in, and will be apparent from, the following Detailed Description and the Figures.

DETAILED DESCRIPTION OF EXAMPLE EMBODIMENTS

Figure 1:
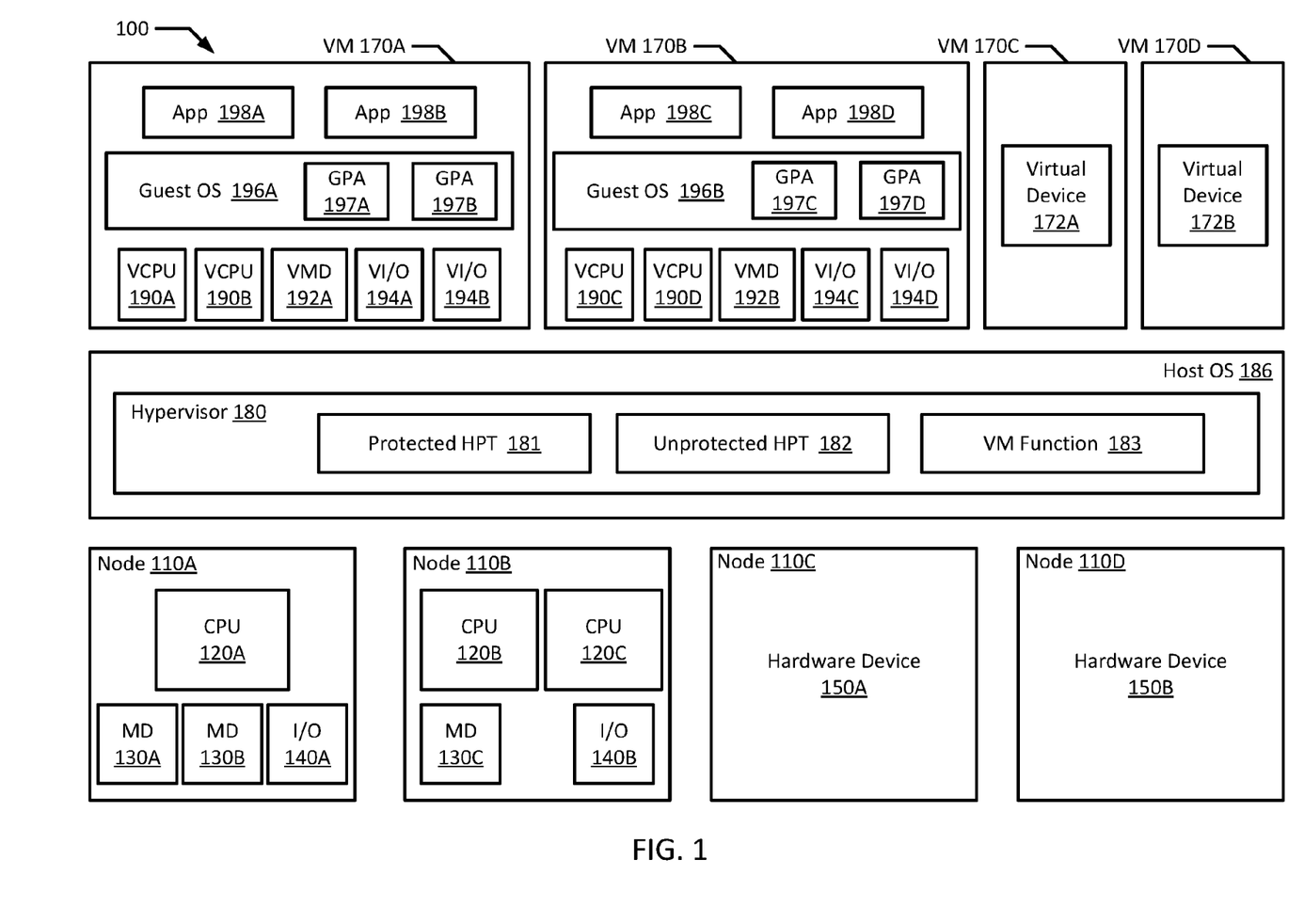
FIG. 1 is a block diagram of an example multiprocessor computer system according to an example embodiment of the present disclosure.

FIG. 1 depicts a high-level component diagram of an example multiprocessor computer system 100 for application memory protection using a host page table switching virtual machine function according to an example embodiment of the present disclosure. Corruption of application memory in virtualized systems may occur as a result of malware attacks. Specifically, malicious software may exploit vulnerabilities in which host page table pointers are exposed in the course of executing applications 198A-D running on virtual machines 170A-D. For example, the malware may acquire access to sensitive application data through these exposed pointers. The present disclosure seeks to reduce these risks in a manner that reduces performance overhead. For example, the hypervisor 180 may set up multiple host page table pointers that are initialized to point to a first host page table 181. If an application 198A makes a request for access to a first page view corresponding to the host page table 181 to be restricted, the hypervisor 180 may grant this request to protect the first page view upon determining that the request should be granted. In an example embodiment, a second unprotected page view corresponding to a second host page table 182 is provided. Then, if the application 198A determines that access to the second unprotected page is required, for example, to process a different task, the application 198A may execute a virtual machine function 183 that selects the second unprotected page view. In this manner, an unprotected page view is only accessible when required. Additional features and advantages of the disclosed method, system, and apparatus are described below.

The computer system 100 may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Each node 110C-D may include a hardware device 150A-B. In an example embodiment, a hardware device (e.g., 150A-B) may include a network device (e.g., a network interface controller (NIC), a network adapter, or any other component that connects a computer to a computer network), a peripheral component interconnect (PCI) device, storage devices, sound or video adaptors, photo/video cameras, printer devices, keyboards, displays, etc.

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-C may be interconnected using a variety of techniques, including a point-to-point processor interconnect, and a system area network, such as an Ethernet-based network. Local connections within each node 110A-D, including the connections between a processor 120A and a memory device 130A-B and between a processor 120A and an I/O device 140A may be provided by one or more local buses of suitable architecture, for example, peripheral component interconnect (PCI). As used herein, a device of the host OS 186 (or "host device") may refer to CPU 120A-C, MD 130A-C, I/O 140A-B, a software device, and/or hardware device 150A-B.

As noted above, computer system 100 may run multiple virtual machines (e.g., VM 170A-D), by executing a software layer (e.g., hypervisor 180) above the hardware and below the virtual machines 170A-D, as schematically shown in FIG. 1. In an example embodiment, the hypervisor 180 may be a component of the host operating system 186 executed by the computer system 100. In another example embodiment, the hypervisor 180 may be provided by an application running on the operating system 186, or may run directly on the computer system 100 without an operating system beneath it. The hypervisor 180 may virtualize the physical layer, including processors, memory, and I/O devices, and present this virtualization to virtual machines 170A-D as devices, including virtual processors (e.g., VCPU 190A-D), virtual memory devices (e.g., VIVID 192A-B), and/or virtual I/O devices (e.g., VI/O 194A-D).

In an example embodiment, a virtual machine 170A-B may execute a guest operating system 196A-B which may utilize the underlying VCPU 190A-D, VIVID 192A-B, and VI/O devices 194A-D. One or more applications 198A-D may be running on a virtual machine 170A-B under the guest operating system 196A-B. The virtual machine 170A-B may include a device register 197A-B. As used herein, a device register 197A-B refers to a configuration space of a device. In an example embodiment, a device may be a device (e.g., VCPU 190A-D, VIVID 192A-B, VI/O devices 194A-D, virtual device 172A-B, etc.) of a guest operating system 196A-B (that is, a "guest device"). In an example embodiment, the guest operating system 196A-B may include a set of guest physical addresses ("GPA") 197A-D.

A virtual machine 170A-B may run any type of dependent, independent, compatible, and/or incompatible applications on the underlying hardware and OS 186. In an example embodiment, applications (e.g., App 198A-D) executing on a virtual machine 170A-B may be dependent on the underlying hardware and/or OS 186. In another example embodiment, applications 198A-D executing on a virtual machine 170A-B may be independent of the underlying hardware and/or OS 186. For example, applications 198A-B executing on a first virtual machine 170A may be dependent on the underlying hardware and/or OS 186 while applications 198C-D executing on a second virtual machine 170B are independent of the underlying hardware and/or OS 186. Additionally, applications 198A-D executing on a virtual machine 170A-B may be compatible with the underlying hardware and/or OS 186. In an example embodiment, applications 198A-D executing on a virtual machine 170A-B may be incompatible with the underlying hardware and/or OS 186. For example, applications 198A-B executing on one virtual machine 170A may be compatible with the underlying hardware and/or OS 186 while applications 198C-D executing on another virtual machine 170B may be incompatible with the underlying hardware and/or OS 186. In an example embodiment, a device may be implemented as a virtual machine 170.

In an example embodiment, a virtual machine 170A-B may include multiple virtual processors (VCPU) 190A-D. Processor virtualization may be implemented by the hypervisor 180 scheduling time slots on one or more physical processors 120A-C such that from the guest operating system's perspective those time slots are scheduled on a virtual processor 190A-D.

In another example embodiment, a virtual machine 170C-D may include virtual devices 172A-B. A virtual device 172A-B may provide the functionality of traditional hardware devices such as network devices, PCI devices, storage devices, sound or video adaptors, photo/video cameras, printer devices, keyboards, displays, etc.

The hypervisor may also include one or more host page tables such as a protected host page table 181 and an unprotected host page table 182. In an example embodiment, the host page table may be an extended page table ("EPT"), translating guest physical addresses to host physical addresses. In another embodiment, the host page table may be the shadow page table translating the guest virtual addresses to host physical addresses. In another embodiment, the host page table may be the hypervisor page table, translating the guest physical addresses to hypervisor virtual addresses. Example embodiments of these data structures are described in greater detail below and as shown in FIG. 2.

Figure 2:
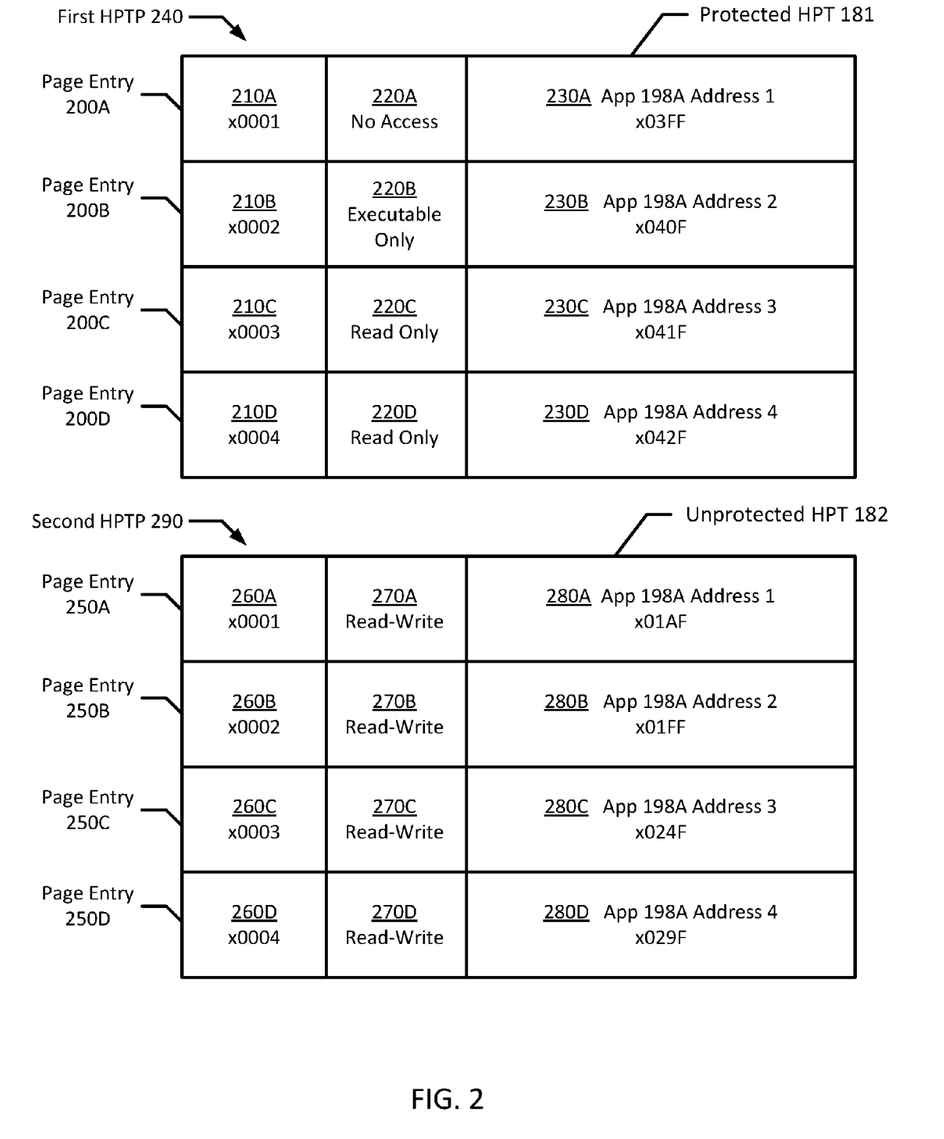
FIG. 2 a block diagram of example protected and unprotected host page tables according to an example embodiment of the present disclosure.
Figure 3:
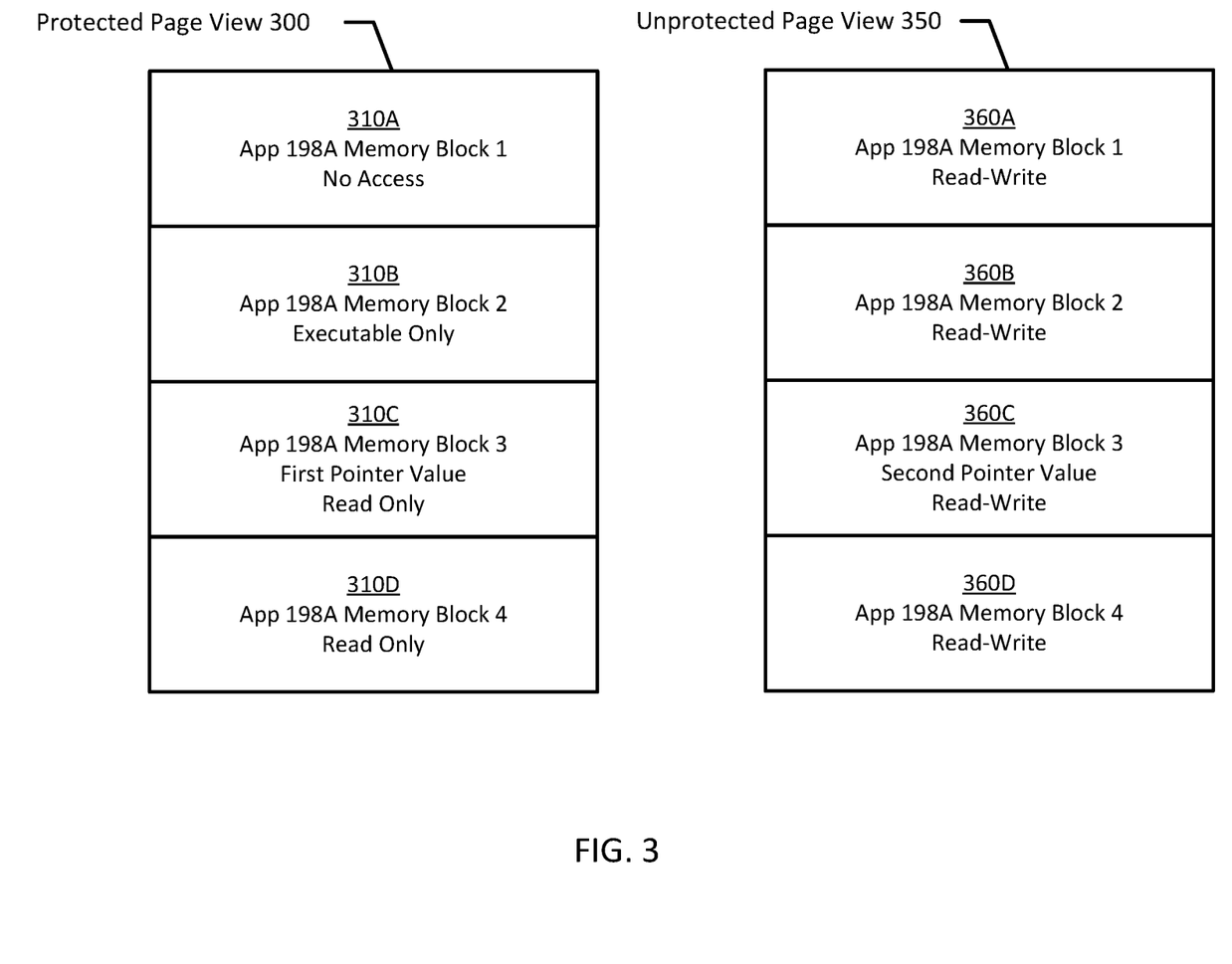
FIG. 3 is a block diagram of example protected and unprotected page views according to an example embodiment of the present disclosure.

FIG. 2 illustrates a protected host page table (otherwise referred to as a page table) 181 and an unprotected host page table 182 according to an example embodiment of the present disclosure. In general, the hypervisor 180 manages the memory usage of the VMs 170A-D. Both virtual memory and physical memory may be divided into pages 310A-D which are identified with a unique number (e.g., Page Frame Number (PFN) 210A-D and/or 260A-D). Example embodiments of pages (e.g., 310A-D and/or 360A-D) and page views (e.g., 300 and/or 350) are described in greater detail below and as shown in FIG. 3.

A host page table 181-182 is a data structure used by the hypervisor 180 to store a mapping of addresses of the guest OS 196A-B to addresses of the host OS 186 (e.g., physical resources of the computer system 100). Accordingly, address translation is handled using the host page tables 181-182. For example, the guest OS 196A-B operating within the VMs 170A-D may be given the impression that there is a contiguous section of guest memory available, when in reality, the available guest memory may be spread across various memory devices 130A-C. In an example embodiment, a host page table 181-182 may be an extended page table that translates guest physical addresses to host physical addresses. In another embodiment, a host page table 181-182 may be a shadow page table that translates guest virtual addresses to host physical addresses. In an example embodiment, a host page table 181-182 may be a hypervisor page table, translating the guest physical addresses to hypervisor virtual addresses.

A host page table 181-182 comprises page entries (e.g., 200A-D and/or 250A-D) that map PFN (e.g., 210A-D and/or 260A-D), for example an address of the guest OS 196A-B, with an address (e.g., 230A-D and/or 280A-D), for example an address of the host OS 186. Host page tables 181-182 may be used together with any paging data structure used by the VMs 170A-D to support translation from guest OS 196A-B to host OS 186 addresses (e.g., 32-bit linear address space using a two-level hierarchical paging structure, Physical Address Extension mode, INTEL Extended Memory 64 Technology mode, etc.). In an example embodiment, host page tables 181-182 may include access status parameters (e.g., 220A-D and/or 270A-D) that indicate an access status for each of the pages (e.g., 310A-D and/or 360A-D). In the illustrated example embodiment, the addresses (230A-D and 280A-D) correspond to addresses of an application 198A. In accordance with this, the pages in the illustrated embodiment in FIG. 3 correspond to pages (otherwise referred to as memory block or memory ranges) 310A-D and 360A-D of the same application 198A. In an example embodiment, host page table pointers (e.g., 240 and/or 290) may be associated with each host page table 181-182. For example, host page table pointer 240 corresponds to protected host page table 181 and host page table pointer 290 corresponds to unprotected host page table 182.

In an example embodiment, host page tables 181-182 may include an access status parameter (e.g., 220A-D and/or 270A-D). The access status parameter (e.g., 220A-D and/or 270A-D) indicates the access status of a page (e.g., 310A-D and/or 360A-D) corresponding to the page entry (e.g., 200A-D and/or 250A-D) of the page table 181-182. For example, an access status parameter (e.g., 220A-D and/or 270A-D) may be used to define that a given page (e.g., 310A-D and/or 360A-D) is inaccessible (or no access), writable (or read-write), write-protected (or read-only), executable (or executable and readable), executable only, etc. For example, as illustrated in the example embodiment in FIG. 2, the page 310A corresponding to page entry 200A, PFN 210A address (x0001), address 230A (x03FF), and access status parameter 220A has been defined in protected host page table 181 as 'No Access'. The hypervisor 180 may be used to modify an access status parameter (e.g., 220A-D and/or 270A-D) of pages (e.g., 310A-D and/or 360A-D). In an example embodiment, a virtual machine 170A-D, guest OS 196A-B, and/or application 198A-D may use the mprotect( ) function to request that the hypervisor 180 modify the access status parameter of a page view or a set of pages.

In the illustrated example embodiment, the protected host page table 181 includes a variety of access protections corresponding to the protected page view 300 including 'No Access,' 'Executable Only,' and 'Read Only.' In an example embodiment, the access protections may all the be same. In an example embodiment, only a subset of the page entries 200A-D of the protected host page table 181 have an access protection such as 'No Access,' 'Executable Only,' and 'Read Only.' In this manner, only a subset of pages 310A-D of the protected page view 300 are protected. In the illustrated example embodiment, the unprotected host page table 182 permits every page in the corresponding unprotected page view 350 to be both read and written to. In an example embodiment, only a subset of the page entries 250A-D of the unprotected host page table 182 are writable (e.g., provided the access status 'Read-Write'). In this manner, only a subset of pages 360A-D of the unprotected page view 350 are writable.

In an example embodiment, a page table 181-182 may include additional information not shown in FIG. 2 including a presence identifier, statistics information, background information, dirty identifiers which indicate that modifications to a page must be written back to disk, etc.

In an example embodiment, one or more page tables 181-182 may be maintained by the hypervisor 180 which map guest OS 196A-B addresses to host OS 186 addresses that are accessible by the hypervisor 180, VMs 170, guest OS 196A-B, Host OS 186, Host OS 186 resources, and/or VM Functions 183. The sizes of different page tables may vary and may include more or fewer entries than are illustrated in FIG. 2.

FIG. 3 illustrates protected page view 300 (and corresponding pages 310A-D) and unprotected page view 350 (and corresponding pages 360A-D) in accordance with an example embodiment of the present disclosure. As noted above, a page (e.g., 310A-D and/or 360A-D) may be a portion of physical or virtual memory designated for storing data. As used herein, a page view (e.g., 300 and/or 350) denotes a mapping from addresses designated for use by VM 170A-D to host OS 186 addresses. In an example embodiment, the page view (e.g., 300 and/or 350) may denote the mapping from PFNs of a VM 170A-D to host OS 186 addresses, as used during normal execution of the VM 170A-D. As illustrated in FIG. 3, pages 310A-D may be defined by access status parameters in accordance with their respective page table 181-182 access status parameters (e.g., 220A-D and/or 270A-D).

In an example embodiment, the hypervisor 180 may provide one or more virtual machine functions (VM Functions) 183 to a virtual machine 170A-D. In an example embodiment, the VM Function 183 may be invoked for a VM 170A, by the guest OS 196A that is running on the VM 170A. In an example embodiment, a VM Function 183 may only be invoked if hypervisor 180 provides access or grants a request. In an example embodiment, the VM Function may be provided by the host CPU on which the hypervisor is executing. In an example embodiment, the VM Function is a host page table switching VM function 183. For example, a VM 170A or guest OS 196A may invoke a VM Function 183 to cause the hypervisor to translate the guest addresses according to the protected host page table or the unprotected host page table. In an example embodiment, a hypervisor 180 may grant a VM 170A or guest OS 196A access to a VM Function 183 to allow the VM 170A or guest OS 196A to switch host page tables without requiring an exit to the hypervisor. In an example embodiment, the hypervisor 180 may also deny the request by causing an undefined opcode exception or a general protection fault exception whenever the VM Function 183 is invoked.

Figure 4:
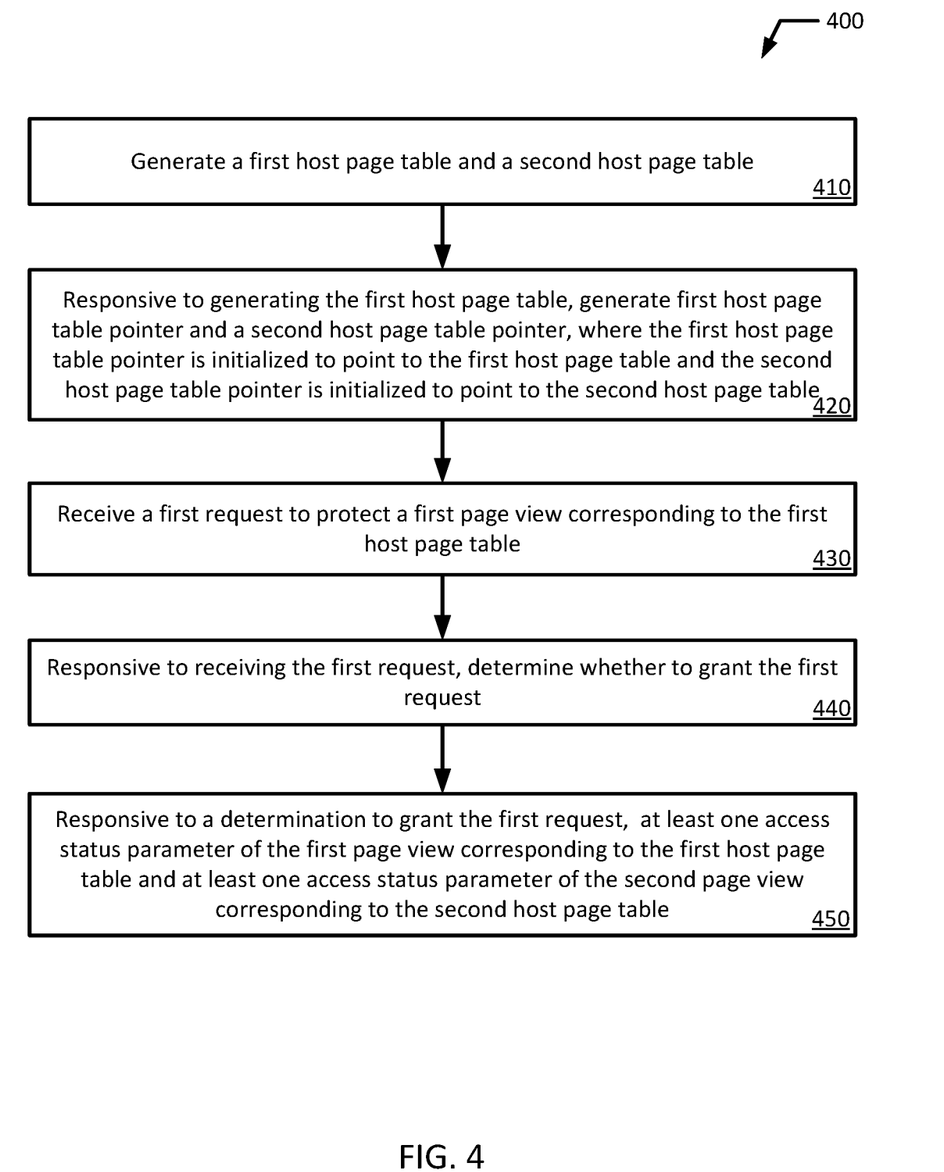
FIG. 4 is a flowchart illustrating an example process for application memory protection using a host page table switching virtual machine function according to an example embodiment of the present disclosure.

FIG. 4 illustrates a flowchart of an example method 400 for application memory protection using a host page table switching virtual machine function. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example embodiment, the method is performed by a hypervisor 180.

The example method 400 starts and the hypervisor 180 generates a first host page table 181 and a second host page table 182 (block 410). In an example embodiment, the first host page table 181 is associated with a first page view 300 which is used by an application 198A executing on a virtual machine 170A. In an example embodiment, the first host page table 181 is initialized such that at least one page entry 200A-D (and correspondingly at least one page 310A-D of page view 300) is writable. In an example embodiment, the first host page table 181 is initialized such that all the page entries 200A-D (and correspondingly all the pages 310A-D of page view 300) are writable. In an example embodiment, the second host page table 182 is generated at the same time as the first host page table. In another example embodiment, the second host page table 182 is generated subsequent to the generation of the first host page table 181.

In an example embodiment, the second host page table 182 is initialized to be accessible to the same application 198A as the first host page table 181. In an example embodiment, the page view 350 (and/or pages 360A-D) corresponding to the second host page table 182 is initialized to be populated with the same data as page view 300 (and/or pages 310A-D). In an example embodiment, page view 350 (and/or pages 360A-D) corresponding to the second host page table 182 is not populated with any data until information is requested from the page view 350 (and/or pages 360A-D) at which time it is populated with the same data as page view 300 (and/or pages 310A-D). In an example embodiment, page view 350 (and/or pages 360A-D) corresponding to the second host page table 182 is not populated with any data until a page fault occurs at which time the page view 350 (and/or pages 360A-D) is populated with the same data as page view 300 (and/or pages 310A-D).

Responsive to generating the first host page table 181, the hypervisor 180 generates a first host page table pointer 240 and a second host page table pointer 290, where the first host page table pointer 240 is initialized to point to the first host page table 181 and the second host page table pointers 290 is initialized to point to the second host page table 182 (block 420).

The hypervisor 180 receives from a first application 198A running on a virtual machine 170A, a first request to protect a first page view 300 corresponding to the first host page table 181 (block 430). In an example embodiment, the first application 198A running on the virtual machine 170A generates the first request to protect the first page view 300 corresponding to the first host page table 181 using the mprotect( ) function. In an example embodiment, the mprotect( ) function takes as its parameters a memory address range and a protection status that is desired. For example, the first application 198A may request that the access status parameter 220A-D corresponding to page entries 200A-D or addresses 230A-D be modified to be read-only. In this example embodiment, if the request is granted by the hypervisor 180, pages 310A-D will be read only. In an example embodiment, the mprotect( ) function may take as its parameters a protection status that is desired and a current page view parameter. In an example embodiment, the current page view parameter indicates to the hypervisor 180 that the currently accessed page view 300 as defined by the current host page table pointer 240 is requested to be protected. In an example embodiment, the current page view parameter is the VM Function 183 parameter called 'PROT_VMFUNC'.

Responsive to receiving the first request, the hypervisor 180 determines whether to grant the first request (block 440). In an example embodiment, the hypervisor 180 may grant the first request if it determines that the application 198A is requesting protection of an address space that belongs exclusively to the application 198A. In an example embodiment, the hypervisor 180A may deny the first request if it determines that the address space for which protection is requested belongs to a different application 198B. In an example embodiment, the hypervisor 180A may deny the first request if it determines that the address space for which protection is requested is shared among multiple applications 198A and 198B. In an example embodiment, the hypervisor 180A may deny the first request if it determines that the address space for which protection is requested is shared memory.

Responsive to a determination to grant the first request, the hypervisor 180 modifies at least one access status parameter 220A-D of the first page view 300 corresponding to the first host page table 181 and at least one access status parameter 270A-D of the second page view 350 corresponding to the second host page table 182 (block 450). In an example embodiment, the hypervisor 180 modifies the at least one access status parameter 270A-D to be writable. In an example embodiment, the hypervisor 180 modifies the at least one access status parameter 220A-D to be at least one of 'Read Only,' 'Executable Only,' and 'No Access' in accordance with the parameters passed in the first request. In this manner, at least one of the pages 310A-D corresponding to the now protected host page table 181 may be at least one of 'Read Only,' 'Executable Only,' and inaccessible. In an example embodiment, the hypervisor 180 modifies every access status parameter 220A-D to be at least one of 'Read Only,' 'Executable Only,' and 'No Access' in accordance with the parameters passed in the first request. In this manner, every one of the pages 310A-D corresponding to the now protected host page table 181 may be at least one of 'Read Only,' 'Executable Only,' and inaccessible. In an example embodiment, in granting the first request, the hypervisor 180 sets a flag that triggers a page fault within the guest OS 196A of the virtual machine 170A (which correspondingly detects the page fault) if the page view 300 corresponding to the now protected host page table 181 is attempted to be accessed in violation of the access status parameters 220A-D. For example, the hypervisor 180 grants the first request and sets the access status parameter 220A to 'Read Only' and an application 198A-D subsequently attempts to write to page 310A, the flag set by the hypervisor 180 will trigger and cause a page fault within the guest OS 196A of the virtual machine 170A (which will correspondingly detect the page fault). In this manner, performance overhead is reduced by triggering a page fault rather than causing an exit to the hypervisor 180.

In an example embodiment, rather than triggering a page fault, if the page view 300 corresponding to the now protected host page table 181 is accessed in violation of the access status parameters 220A-D, an exit to the hypervisor 180 is triggered. The hypervisor 180 may then send an interrupt to the guest OS 196A of the virtual machine 170A to trigger the page fault.

In an example embodiment, the hypervisor 180 generates the unprotected second host page table 182 and unprotected page view 350 upon granting the first request. In an example embodiment, at least one of the access status parameters 270A-D corresponding to the unprotected second host page table 182 are initialized to be writable ('Read-Write'). In this manner, at least one of the pages 360A-D corresponding to the unprotected second host page table may be writable. In an example embodiment, every one of access status parameters 270A-D corresponding to the second host page table 182 are initialized to be writable ('Read-Write'). In this manner, every one of the pages 360A-D corresponding to the unprotected second host page table may be writable.

In an example embodiment, the hypervisor 180 populates the unprotected page view 350 with the same data as the protected page view 300 upon granting the first request. In an example embodiment, the hypervisor 180 populates at least one page 360A-D of the unprotected page view 350 corresponding to the application 198A with the same data as at least one page 310A-D of the protected page view 300 corresponding to the application 198A upon granting the first request.

In an example embodiment, the hypervisor 180 then writes the first pointer value corresponding to the first host page table pointer 240 into a first page of the first page view 300 and the second pointer value corresponding to the second host page table pointer 290 into a second page of the second page view 350 and provides to the virtual machine 170A (and/or the application 198A/guest OS 196A) the first pointer value and the second pointer value. In an example embodiment, the first pointer value provided is not the first host page table pointer 240 and the second pointer value provided is not the second host page table pointer 290. For example, the first and second pointer values may be host page table pointer index values corresponding to the host page table pointers 240 and 290. In this manner, the host page table pointers 240 and 290 are kept hidden from the application 198A (and/or the guest OS 196A/virtual machine 170A) to preserve the security and integrity of the system. In an example embodiment, the hypervisor 180 maintains a mapping between the host page table pointer index values and the real host page table pointers 240 and 290 using a host page table pointer data structure.

In an example embodiment, the virtual machine 170A (and/or application 198B/guest OS 196A) may write the first pointer value into a first page of the first page view 300 and the second pointer value into a second page of the second page view 350. A guest physical address 197A points to the first page of the first page view 300 and the second page of the second page view 350.

In an example embodiment, the application 198A (and/or the guest OS 196A/virtual machine 170A) may execute a virtual machine function 183, where the virtual machine function 183 receives the second pointer value as a parameter and, when executed, selects or switches to the second page view 350. In an example embodiment, the virtual machine function 183 is the VMFUNC EPTP switching instruction. In this manner, the present disclosure permits an application 198A (and/or the guest OS 196A/virtual machine 170A) to control (i.e. access and switch as desired) current page view (300 or 350) without exiting to the hypervisor 180. This thereby reduces performance overhead while improving system security by reducing the risk of application memory corruption.

In an example embodiment, the application 198A (and/or the guest OS 196A/virtual machine 170A) may execute the virtual machine function 183 responsive to determining that switching to the second page view 350 is either required or desirable. In an example embodiment, the application 198A (and/or the guest OS 196A/virtual machine 170A) may determine that switching to the second page view 350 is either required or desirable responsive to determining that the first page view 300 is inappropriate for a first task. For example, the application 198A (and/or the guest OS 196A/virtual machine 170A) may determine that the first task requires writing to memory of the application 198A and that writing to the current protected first page view 300 would generate a page fault; accordingly, the application 198A (and/or the guest OS 196A/virtual machine 170A) may switch to a different unprotected second page view 350 to facilitate writing to the memory of the application 198A. In an example embodiment, the application 198A (and/or the guest OS 196A/virtual machine 170A) may determine that the first task does not require writing to memory of the application 198A and continuing to use the current unprotected second page view 350 would be undesirable or leave the system vulnerable; accordingly, the application 198A (and/or the guest OS 196A/virtual machine 170A) may switch to a different protected second page view 300 to preclude writing to the memory of the application 198A.

In an example embodiment, the application 198A (and/or the guest OS 196A/virtual machine 170A) may determine that switching to the unprotected second page view 350 is required responsive to determining that the unprotected second page view 350 is appropriate for a second task. For example, the application 198A (and/or the guest OS 196A/virtual machine 170A) may determine during execution of a first task that a second task requires writing to memory of the application 198A and that writing to the current protected first page view 300 would generate a page fault; accordingly, prior to or upon commencing execution of the second task the application 198A (and/or the guest OS 196A/virtual machine 170A) may switch to a different unprotected second page view 350 to facilitate writing to the memory of the application 198A. In an example embodiment, the application 198A (and/or the guest OS 196A/virtual machine 170A) may determine during execution of a first task that a second task does not require writing to memory of the application 198A and continuing to use the current unprotected second page view 350 upon execution of the second task would be undesirable or leave the system vulnerable; accordingly, prior to or upon commencing execution of the second task the application 198A (and/or the guest OS 196A/virtual machine 170A) may switch to a different protected second page view 300 to preclude writing to the memory of the application 198A.

In an example embodiment, the application 198A (and/or the guest OS 196A/virtual machine 170A) may include a guest physical address 197A that points to a page 310A of the current protected first page view 300 and a guest physical address 197B that points to a page 360A of a different unprotected second page view 350. In an example embodiment, exactly one guest physical address 197A points to two different pages (e.g., 310A and 360A) of two different page views (e.g., 300 and 350). In an example embodiment, the hypervisor 180 or the application 198A (and/or the guest OS 196A/virtual machine 170A) writes the first pointer value corresponding to the first host page table pointer 240 to the page 310A of the current protected first page view 300. In an example embodiment, the hypervisor 180 or the application 198A (and/or the guest OS 196A/virtual machine 170A) writes the second pointer value corresponding to the second host page table pointer 290 to the page 360A of the different unprotected second page view 350.

In an example embodiment, the application 198A (and/or the guest OS 196A/virtual machine 170A) may provide the virtual machine function 183 with the first pointer value to select or switch to the first page view 300 responsive to retrieving the first pointer value from the page 310A of the current protected first page view 300. In an example embodiment, the application 198A (and/or the guest OS 196A/virtual machine 170A) may provide the virtual machine function 183 with the second pointer value to select or switch to the second page view 350 responsive to retrieving the second pointer value from the page 360A of the different unprotected second page view 350.

In an example embodiment, the application 198A (and/or the guest OS 196A/virtual machine 170A) may determine that the first page view 300 is inappropriate for a first task (and/or the second page view 350 is appropriate for a second task) responsive to (a) retrieving the first pointer value corresponding to the first host page table pointer 240 from the page 310A of the current protected first page view 300, (b) storing the first pointer value into the task context of the first (or previous) task, (c) retrieving the second pointer value corresponding to the second host page table pointer 290 from the task context of the second (or new) task, and (d) determining that the second (or expected) pointer value is different from the first pointer value.

In an example embodiment, the application 198A (and/or the guest OS 196A/virtual machine 170A) may determine that the second page view 350 is inappropriate for a first task (and/or the first page view 300 is appropriate for a second task) responsive to (a) retrieving the second pointer value corresponding to the second host page table pointer 290 from the page 360A of the current unprotected second page view 350, (b) storing the second pointer value into the task context of the first (or previous) task, (c) retrieving the first pointer value corresponding to the first host page table pointer 240 from the task context of the second (or new) task, and (d) determining that the second (or expected) pointer value is different from the first pointer value.

In an example embodiment, the application 198A (and/or the guest OS 196A/virtual machine 170A) may determine that switching to the second unprotected page view 350 is required responsive to receiving a page fault. For example, the application 198A (and/or the guest OS 196A/virtual machine 170A) may detect an interrupt from the hypervisor 180 or a page fault caused by the application 198A's attempt to write to the protected page view 300 and indicate to the current task that switching to a different unprotected page view 350 is required.

Figure 5:
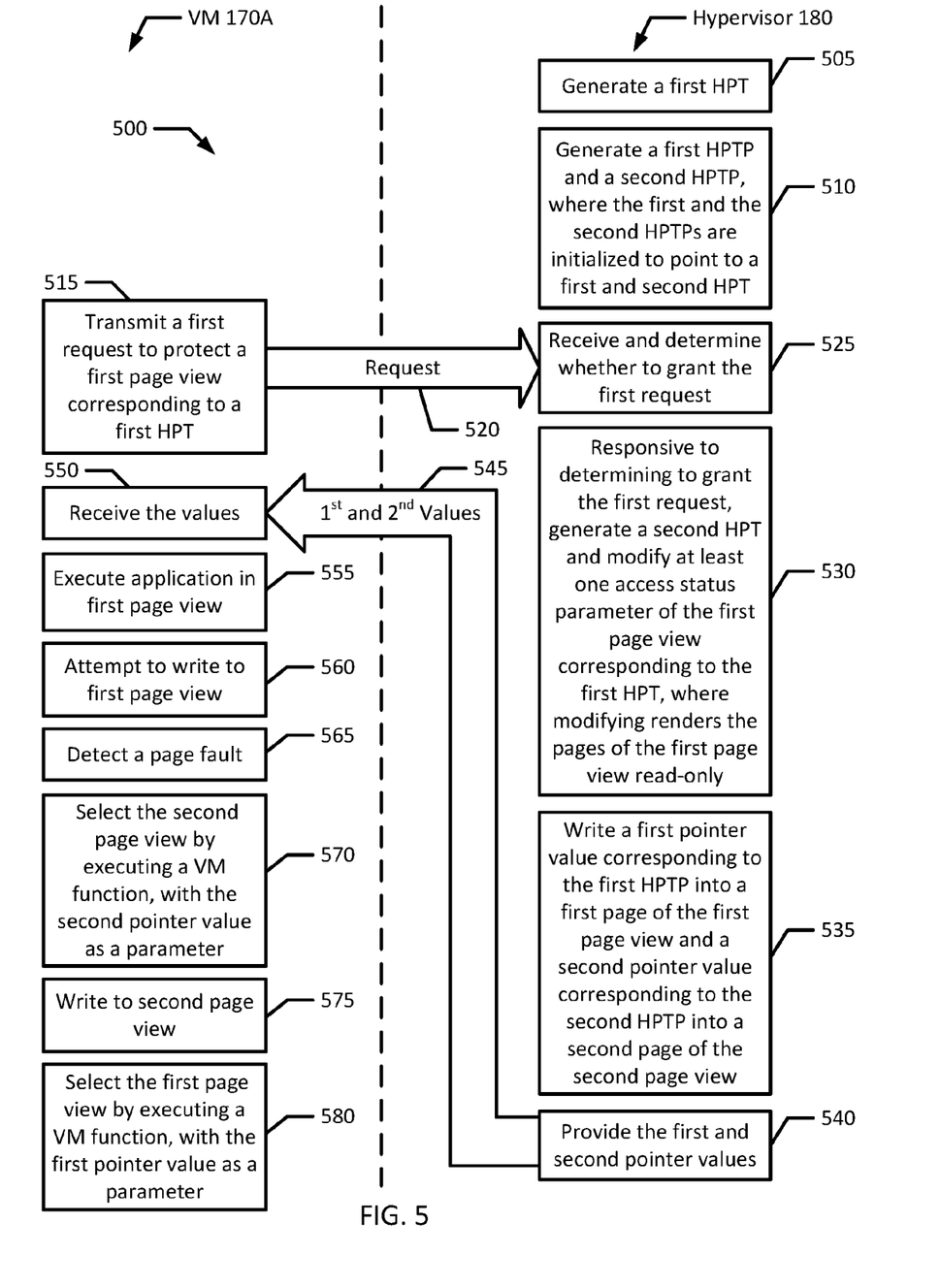
FIG. 5 is a flow diagram illustrating an example process for application memory protection using a host page table switching virtual machine function according to an example embodiment of the present disclosure.

FIG. 5 illustrates a flow diagram of an example method 500 for application memory protection using a host page table switching virtual machine function in accordance with an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

In the illustrated example embodiment, a hypervisor 180 generates a first host page table 181 (block 505). The hypervisor 180 then generates a first host page table pointer 240 and a second host page table pointer 290, where the first host page table pointer 240 is initialized to point to the first host page table 181 and the second host page table pointer 290 is initialized to point to the second host page table 182 (block 510). A virtual machine 170A (and/or application 198B/guest OS 196A) transmits a first request to protect a first page view 300 corresponding to the first host page table 181 (blocks 515 and 520). The hypervisor 180 receives the first request and determines whether to grant the first request (block 525). Responsive to a determination to grant the first request, the hypervisor 180 generates a second host page table 182 and modifies the access status parameters of the first page view 300 corresponding to the first host page table 181 to render the pages of the first page view 300 read-only (block 530). The hypervisor 180 then writes a first pointer value corresponding to the first host page table pointer 240 into a first page of the first page view 300 and a second pointer value corresponding to the second host page table pointer 290 into a second page of the second page view 350 (block 535). The hypervisor 180 provides to the virtual machine 170A (and/or application 198B/guest OS 196A) the first pointer value and the second pointer value (blocks 540 and 545). The virtual machine 170A (and/or application 198B/guest OS 196A) receives the first and second pointer values (block 550). In an example embodiment, the virtual machine 170A (and/or application 198B/guest OS 196A) writes the first pointer value into a first page of the first page view 300 and the second pointer value into a second page of the second page view 350. A guest physical address 197A points to the first page of the first page view 300 and the second page of the second page view 350. In an example embodiment, in lieu of providing the first and second pointer values to the the virtual machine 170A (and/or application 198B/guest OS 196A), the hypervisor 180 writes the first pointer value into a first page of the first page view 300 and the second pointer value into a second page of the second page view 350.

The virtual machine 170A (and/or guest OS 196A) executes the application 198B with the now protected first page view 300 as the current page view (block 555). The virtual machine 170A (and/or application 198B/guest OS 196A) attempts to write first data to the now protected first page view 300 (block 560). The virtual machine 170A (and/or application 198B/guest OS 196A) detects a page fault due to attempting to write to the protected first page view 300 (block 565). The virtual machine 170A (and/or application 198B/guest OS 196A) selects the second page view 350 by executing a VM function 183, where the VM function 183 receives the second pointer value as a parameter (block 570). The virtual machine 170A (and/or application 198B/guest OS 196A) writes the first data to the unprotected second page view 350 (block 575). The virtual machine 170A (and/or application 198B/guest OS 196A) then selects the protected first page view 300 by executing a VM function 183, where the VM function 183 receives the first pointer value as a parameter.

Figure 6:
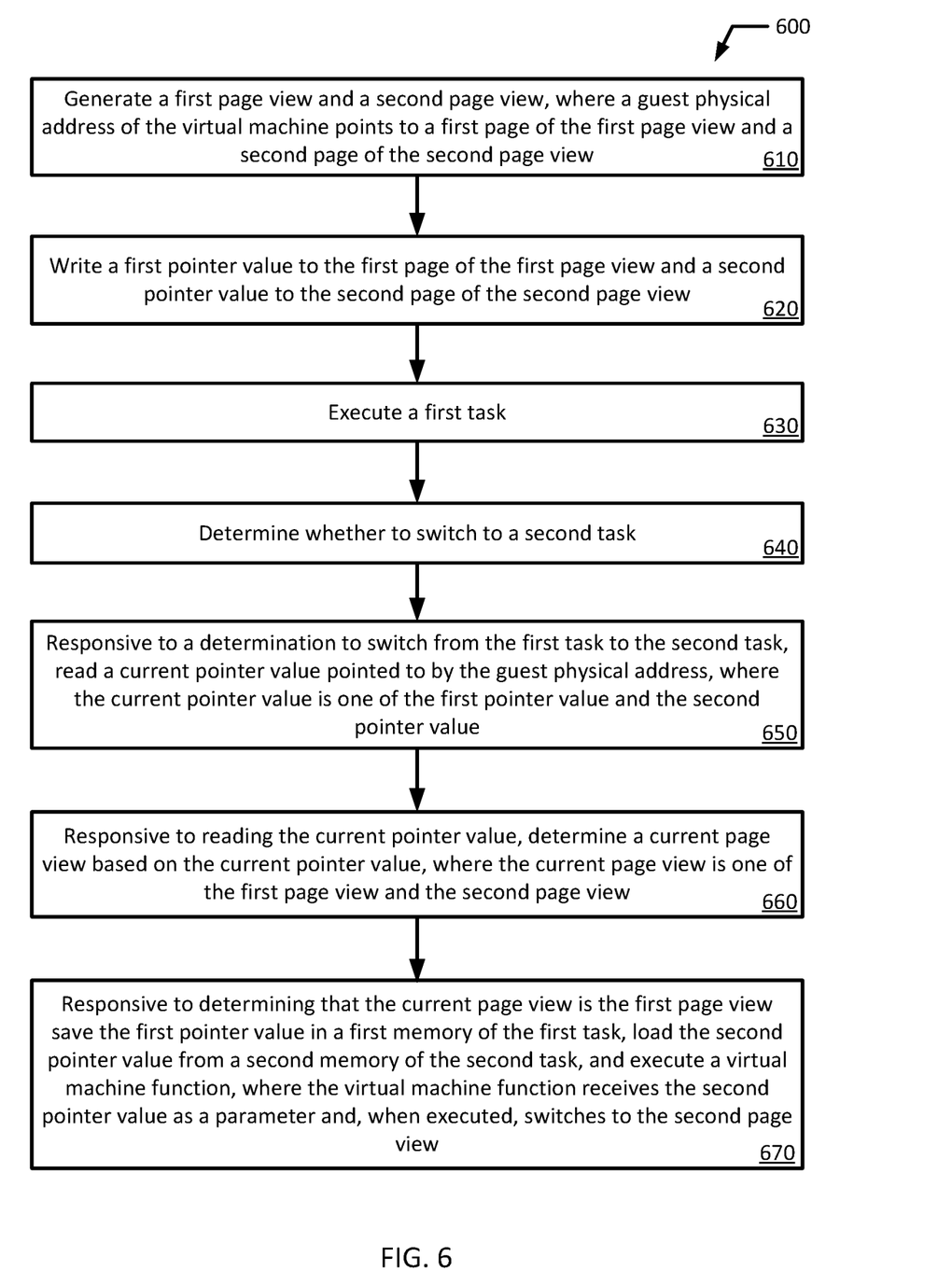
FIG. 6 is a flowchart illustrating an example process for application memory protection using a host page table switching virtual machine function according to an example embodiment of the present disclosure.

FIG. 6 illustrates a flowchart of an example method 600 for application memory protection using a host page table switching virtual machine function. Although the example method 600 is described with reference to the flowchart illustrated in FIG. 6, it will be appreciated that many other methods of performing the acts associated with the method 600 may be used. For example, the order of some of the blocks may be changed, certain blocks may be combined with other blocks, and some of the blocks described are optional. The method 600 may be performed by processing logic that may comprise hardware (circuitry, dedicated logic, etc.), software, or a combination of both. In an example embodiment, the method is performed by one or more of a hypervisor 180, a virtual machine 170A, a guest OS 196A, and an application 198A.

The example method 600 starts and the hypervisor 180 generates a first page view 300 and a second page view 350, where a guest physical address 197A of the virtual machine 170A points to a first page 310C of the first page view 300 and a second page 360C of the second page view 350 (block 610). A first pointer value is then written to the first page 310C of the first page view 300 and a second pointer value is written to the second page 360C of the second page view 350 (block 620). In an example embodiment, the hypervisor 180 writes the first pointer value to the first page 310C of the first page view 300 and writes the second pointer value to the second page 360C of the second page view 350. In an example embodiment, the virtual machine 170A (and/or application 198B/guest OS 196A) writes the first pointer value to the first page 310C of the first page view 300 and writes the second pointer value to the second page 360C of the second page view 350. In an example embodiment, the first pointer value corresponds to the first host page table pointer 240 and a second pointer value corresponds to the second host page table pointer 290.

The virtual machine 170A (and/or application 198B/guest OS 196A) executes a first task (block 630). In an example embodiment, the first task is part of a first application 198A. The virtual machine 170A (and/or application 198B/guest OS 196A) determines whether to switch to a second task (block 640). In an example embodiment, the second task is part of the first application 198A. In an example embodiment, the second task is part of a second application 198A.

Responsive to a determination to switch from the first task to the second task, the virtual machine 170A (and/or application 198B/guest OS 196A) reads a current pointer value pointed to by the guest physical address 197A, where the current pointer value is one of the first pointer value and the second pointer value (block 650). Responsive to reading the current pointer value, determine a current page view based on the current pointer value, where the current page view is one of the first page view and the second page view (block 660). In an example embodiment, the current page view is the page view presently being used by the virtual machine 170A (and/or application 198B/guest OS 196A).

Responsive to determining that the current page view is the first page view 300, virtual machine 170A (and/or application 198B/guest OS 196A) saves the first pointer value in a first memory 310C of the first task, load the second pointer value from a second memory 360C of the second task, and execute a virtual machine function 183, where the virtual machine function 183 receives the second pointer value as a parameter and, when executed, selects or switches to the second page view 350 (block 670). In an example embodiment, once the virtual machine 170A (and/or application 198B/guest OS 196A) switches to the second page view 350, the second page view 350 is the current page view.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The example embodiments may be embodied in the form of computer-implemented processes and apparatuses for practicing those processes. An embodiment may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
   a memory;
   one or more processors, in communication with the memory;
   a virtual machine, including a guest operating system (OS), executing on the one or more processors; and
   a hypervisor executing on the one or more processors,
   wherein the one or more processors are configured to:
   generate, by the hypervisor, a first page view and a second page view, wherein a guest physical address of the virtual machine points to a first page of the first page view, which is protected, and a second page of the second page view, which is unprotected;
   write a first pointer value to the first page of the first page view and a second pointer value to the second page of the second page view;
   execute, by the guest OS, a first task;
   determine, by the guest OS, whether to switch to a second task;
   responsive to a determination to switch from the first task to the second task, read, by the guest OS, a current pointer value pointed to by a guest physical address, wherein the current pointer value is one of the first pointer value and the second pointer value;
   responsive to reading the current pointer value, determine, by the guest OS, a current page view based on the current pointer value, wherein the current page view is one of the first page view and the second page view; and
   responsive to determining that the current page view is the first page view:
   save, by the guest OS, the first pointer value in a first memory of the first task;
   load, by the guest OS, the second pointer value from a second memory of the second task; and
   execute, by the guest OS, a virtual machine function, wherein the virtual machine function receives the second pointer value as a parameter and, when executed, switches to the second page view.

2. The system of claim 1, wherein the hypervisor executing on the one or more processors is further configured to:
   generate, by the hypervisor, a first host page table and a second host page table;
   responsive to generating the first host page table, generate, by the hypervisor, a first host page table pointer and a second host page table pointer, wherein the first host page table pointer is initialized to point to the first host page table and the second host page table pointer is initialized to point to the second host page table;
   receive, from a first application running on the virtual machine, a first request to protect the first page view corresponding to the first host page table;
   responsive to receiving the first request, determine, by the hypervisor, whether to grant the first request;
   responsive to a determination to grant the first request, modify, by the hypervisor, at least one access status parameter of the first page view corresponding to the first host page table and the second page view corresponding to the second host page table.

3. The system of claim 1, wherein the hypervisor executing on the one or more processors is further configured to write the first pointer value into the first page of the first page view and the second pointer value into the second page of the second page view, and wherein the hypervisor executing on the one or more processors is further configured to provide to the virtual machine the first pointer value corresponding to the first host page table pointer and the second pointer value corresponding to the second host page table pointer.

4. The system of claim 1, wherein the guest OS executing on the one or more processors is further configured to write the first pointer value into the first page of the first page view and the second pointer value into the second page of the second page view.

5. A system comprising:
   a memory;
   one or more processors, in communication with the memory;
   a virtual machine, including a guest operating system (OS), executing on the one or more processors; and
   a hypervisor executing on the one or more processors;
   wherein the one or more processors are configured to:
   generate, by the hypervisor, a first host page table and a second host page table;
   responsive to generating the first host page table, generate, by the hypervisor, a first host page table pointer and a second host page table pointer, wherein the first host page table pointer is initialized to point to the first host page table and the second host page table pointer is initialized to point to the second host page table;
   receive, from a first application running on the guest OS, a first request to protect a first page view corresponding to the first host page table;
   responsive to receiving the first request, determine, by the hypervisor, whether to grant the first request; and
   responsive to a determination to grant the first request, modify, by the hypervisor, at least one access status parameter of the first page view corresponding to the first host page table and at least one access status parameter of a second page view corresponding to the second host page table,
   wherein the first page view is protected based on the first request, and the second page view is unprotected.

6. The system of claim 5, wherein the hypervisor executing on the one or more processors is further configured to write a first pointer value corresponding to the first host page table pointer into a first page of the first page view and a second pointer value corresponding to the second host page table pointer into a second page of the second page view, and wherein the hypervisor executing on the one or more processors is further configured to provide to the guest OS the first pointer value and the second pointer value.

7. The system of claim 5, wherein the guest OS executing on the one or more processors is further configured to write a first pointer value corresponding to the first host page table pointer into a first page of the first page view and a second pointer value corresponding to the second host page table pointer into a second page of the second page view.

8. The system of claim 6, wherein the guest OS executing on the one or more processors is further configured to execute a virtual machine function, wherein the virtual machine function receives the second pointer value as a parameter and, when executed, selects the second page view.

9. The system of claim 6, wherein the guest OS is further configured to:
   determine whether the first page view is inappropriate for a first task;
   responsive to determining that the first page view is inappropriate for the first task, determine that switching to the second page view is required; and responsive to determining that switching to the second page view is required, executing a virtual machine function, wherein the virtual machine function, when executed, selects the second page view.

10. The system of claim 6, wherein the guest OS is further configured to:
determine whether the second page view is appropriate for a second task;
responsive to determining that the second page view is appropriate for the second task, determine that switching to the second page view is required; and
responsive to determining that switching to the second page view is required, executing a virtual machine function, wherein the virtual machine function, when executed, selects the second page view.

11. The system of claim 5, wherein the guest OS is further configured to:
detect a page fault;
responsive to detecting the page fault, determine whether switching to the second page view is required; and
responsive to determining that switching to the second page view is required, executing a virtual machine function, wherein the virtual machine function, when executed, selects the second page view.

12. The system of claim 5, wherein modifying the at least one access status parameter of the first page view renders at least one page of the first page view read-only.

13. The system of claim 5, wherein modifying the at least one access status parameter of the first page view renders at least one page of the second page view writable.

14. The system of claim 5, wherein the second host page table is generated responsive to a determination to grant the first request.

15. A method, comprising:
generating, by a hypervisor executing on a computer system, a first host page table and a second host page table;
responsive to generating the first host page table, generating, by the hypervisor, a first host page table pointer and a second host page table pointer, wherein the first host page table pointer is initialized to point to the first host page table and the second host page table pointer is initialized to point to the second host page table;
receiving, from a first application running on the virtual machine, a first request to protect a first page view corresponding to the first host page table;
responsive to receiving the first request, determining, by the hypervisor, whether to grant the first request; and
responsive to a determination to grant the first request, modifying, by the hypervisor, at least one access status parameter of the first page view corresponding to the first host page table and at least one access status parameter of the second page view corresponding to the second host page table,
wherein the first page view is protected based on the first request, and the second page view is unprotected.

16. The method of claim 15, further comprising writing, by the hypervisor, a first pointer value corresponding to the first host page table pointer into a first page of the first page view and a second pointer value corresponding to the second host page table pointer into a second page of the second page view, and providing, by the hypervisor, to a guest OS the first pointer value and the second pointer value.

17. The method of claim 15, further comprising writing, by a guest OS, a first pointer value corresponding to the first host page table pointer into a first page of the first page view and a second pointer value corresponding to the second host page table pointer into a second page of the second page view.

18. The method of claim 15, wherein modifying the at least one access status parameter of the first page view renders at least one page of the first page view read-only.

19. The method of claim 15, wherein modifying the at least one access status parameter of the second page view renders at least one page of the second page view writable.

* * * * *

UNITED STATES PATENT AND TRADEMARK OFFICE
CERTIFICATE OF CORRECTION

PATENT NO. : 10,248,785 B2  
APPLICATION NO. : 15/055904  
DATED : April 2, 2019  
INVENTOR(S) : Michael Tsirkin Page 1 of 1

It is certified that error appears in the above-identified patent and that said Letters Patent is hereby corrected as shown below:

In the Specification

In Column 4, Line 19, replace "VIVID" with --VMD--;

In Column 4, Line 23, replace "VIVID" with --VMD--;

In Column 4, Line 30, replace "VIVID" with --VMD--.

Signed and Sealed this  
Twenty-fifth Day of June, 2019

Andrei Iancu  
*Director of the United States Patent and Trademark Office*